Oct. 15, 1968  R. LAROCHE  3,405,774
WEIGH FEED MECHANISM
Filed March 20, 1967
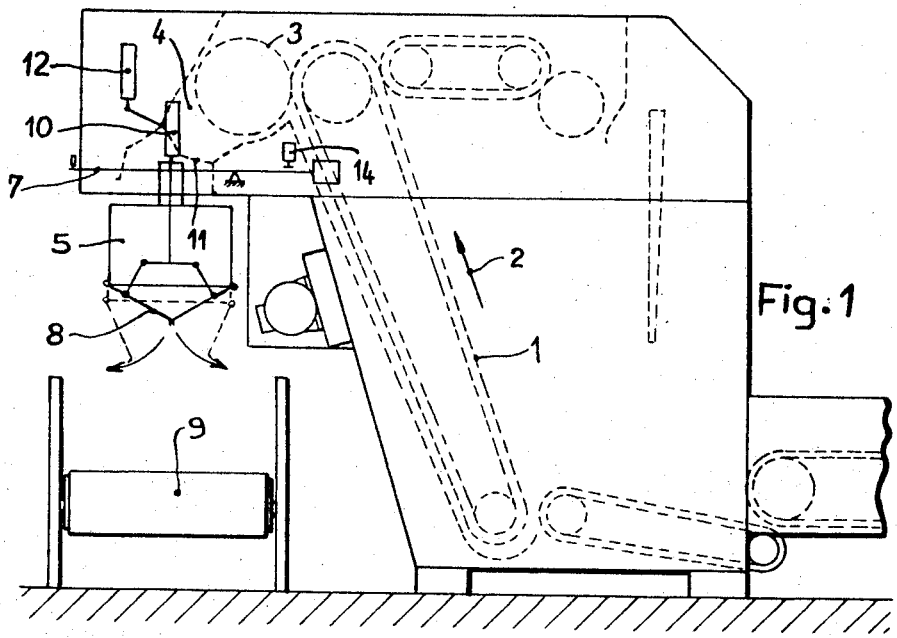
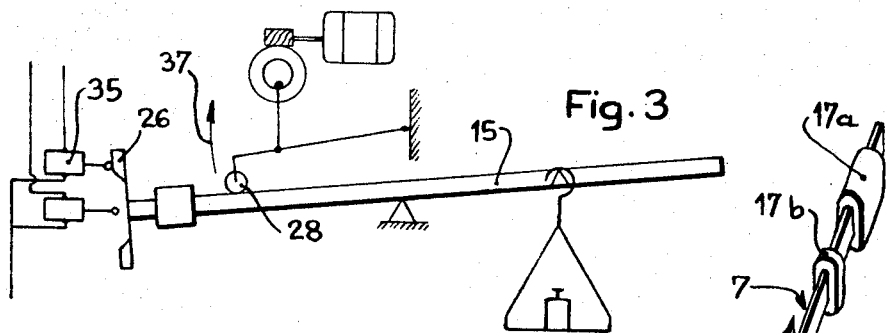
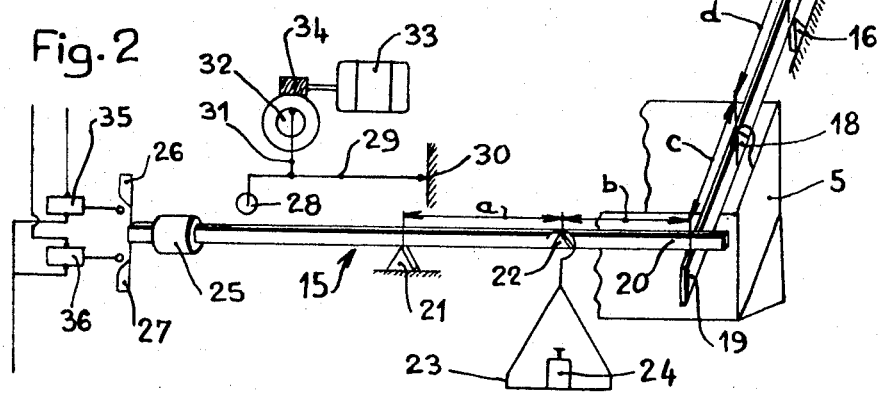

3,405,774
WEIGH FEED MECHANISM
Robert Laroche, Cours, France
Filed Mar. 20, 1967, Ser. No. 624,333
Claims priority, application France, Mar. 25, 1966, 47,099
7 Claims. (Cl. 177—46)

ABSTRACT OF THE DISCLOSURE

A weigh feed mechanism for textile fibers having a first pivoted beam carrying a weigh pan and a second beam loaded by a weight periodically engaging the first beam so that the resulting load on the first beam is equal to the proposed weight of the fibers in the weigh pan. A pair of micro-switches are adapted to be engaged by stops carried by the beam system to alert the operator of faulty calibration.

---

This invention relates to weigh feed mechanisms, and more particularly to weigh feed mechanisms for textile machines such as hopper feeders or bale-breakers. These mechanisms are used in the textile industry to ensure the regular feeding of some machine with carefully selected amounts of fibres of different kinds or compositions. These devices are also used to prepare precise mixtures including different percentages originating from different batches of various fibres.

However, on automatically-working production machines, these mechanisms carry out several weighings a minute and generally there is nothing which checks their accuracy while they are working. In particular, in consequence of wear on the knife-edges of the weigh beams or because of the accumulation of dirt on them, or again because of an accident or of the loosening of some part, it may happen that the weighings are inaccurate without their being noticed. The mechanism then continues to work, giving out weighings which are faulty and the error could be corrected.

The present invention has the main object of eliminating these disadvantages by providing a device which automatically verifies the accuracy of the weight measured after a period corresponding to an arbitrarily chosen number of successive weighings.

A weigh-feed mechanism according to the invention comprises a first pivoted beam, a weigh pan suspended on said first pivoted beam, a second pivoted beam disposed above said first pivoted beam, a weight suspended from said second pivoted beam, control means for lowering one end of said second beam to bear on said first beam after a predetermined number of weighing operations of said weigh pan, when said pan is empty and measuring means for sensing departure of said second beam for a correct inclination when said second beam rests on said first beam.

According to a preferred feature of the invention said measuring means comprises limit detection devices for detecting inclination of said second beam beyond the ends of a preselected tolerance. There may, for example, be a pair of spaced stops carried by said second beam and operatively engageable with limit switches.

When the second beam is lowered on to the first, it applies to this a fictitious calibrating load according to lever arms arranged in such a way that its effect on the said first beam is similar to the correct load which it is desired to weigh exactly. It will be understood that any displacement of the balance beam will cause an abnormal deviation of the second beam which then opens one or other of the limit switches and automatically causes the stopping of the machine, and, in this event, the starting of an audible or visible alarm-signal. Staff are alerted, and proceed to repair the device. The machine is thus prevented from continuing to dispense badly proportioned mixtures which are more often than not irrecoverable.

The attached drawing, given by way of example, will allow the better understanding of the invention, its characteristics, and the advantages it is able to procure.

FIGURE 1 is a view in elevation of a textile weigher-bale-breaker fitted with an automatic calibrating device according to the invention, FIGURE 2 is a schematic view in perspective of this device when the machine is correctly adjusted, and FIGURE 3 shows the second beam held in abeyance by the programming device.

The weigher-bale-breaker shown in FIGURE 1 comprises a hopper in which an inclined conveyor belt 1 raises textile products in the direction shown by the arrow 2, as far as a detaching roller 3. This latter roller sends the material through a duct 4 into a weigh pan 5 which is suspended on the oscillating beam 7 of a balance. This pan 5 includes in the known manner, an opening bottom 8, the working of which allows the weighed material to be dropped out on to a conveyor belt 9. The opening or closing of the bottom 8 of the pan 5 is controlled by a jack 10.

A swinging shutter 11 is arranged across the duct 4 which it can block or leave free as desired by the action of a control jack 12.

On starting, the shutter 11 is open and the detaching roller 3 sends material into the pan 5, of which the bottom is closed. When the required weight of material in the hopper 5 is reached the beam 7 is lowered to a horizontal position, and its right hand end (FIGURE 1) operates a micro-switch 14 which cuts off the current supplying the motor driving the belt 1. Simultaneously, this micro-switch 14 operates the jack 12 which closes the duct 4 by means of the shutter 11, which stops the material in course of falling. When the jack 10 opens the bottom 8 of the pan 5, the weighed charge of material in the pan falls on to the conveyor belt 9. The pan being empty, the beam 7 rises again and releases the microswitch 14, which sets in motion reverse operations, that is to say, the closing of the opening bottom 8, the opening of the shutter 11 in the duct 4, and the starting up of the raising belt 1.

It will be understood that if several feeders or bale-breakers of this kind are placed to discharge on to the same belt 9, the latter carries away a succession of portions of various fibres corresponding to a given proportion by weight, thus producing a blend of materials.

The device provided by the invention is intended to verify automatically and periodically the calibration of the balance. It comprises a second beam 15, preferably arranged in a vertical plane perpendicular to that of the first beam 7, as shown in FIGURE 2.

The first beam 7 oscillates in the known way on a knife-edge 16, and it is fitted with sliders 17a and 17b which allow the weight required to be regulated. In addition, it includes a coupling knife-edge 18 from which the pan 5 is suspended. The first beam 7 extends beyond the knife-edge, 18 in an arm 19 on which the free end 20 of the second beam 15 is able to be brought to bear. This latter oscillates on a fixed knife-edge 21, and it carries a coupling knife-edge 22 placed between the knife-edge 21 and the tip 20. This knife-edge 22 supports a tray 23 on which is placed a calibration weight 24.

On the other side of the knife-edge 21, the second beam 15 is provided with a regulating slider 25 and terminates in two stops 26 and 27.

The weight 24 and the different lever arms which are interposed in the mechanism in such a way that when the tip 20 of the second beam 15 rests on the arm 19 of the first beam 7 under the action of the weight 24 when the pan is empty, the tilt taken up by the beam 7 about the knife-edge 16 shall be precisely the same as that which it would take up if the second beam 15 were withdrawn and if the pan 5 were charged with exactly the required weight of fibres. In order to produce this effect, the slider 17a constitutes only the tare corresponding to the empty weight of the hopper 5. The slider 17b is used to balance the weight of material which it is desired to load into the pan 5. The slider 25 is provided only to constitute the tare of the tray 23 and of the stops 26 and 27. Finally, the respective lengths of the lever arms are chosen in such a way as to establish the ratio:

$$\frac{a+b}{a} = \frac{c+d}{d}$$

where:
    $a$ is the distance between the knife-edges 21 and 22,
    $b$ is the distance separating the knife-edge 22 from the point of contact of the tip 20 of the beam 15 with the beam 7, $c$ is the distance separating the knife-edge 18 from the above mentioned point of contact of the two beams, and $d$ is the distance between the knife-edges 16 and 18.

Owing to this arrangement, the whole system is in balance when the weight 24 is precisely equal to the charge of material which it is proposed to weigh in the pan 5.

Above the rear arm of the second beam 15, there is provided a thrust-roller 28 fitted to the free end of an arm 29 which swings on a fixed pivot 30. This arm 29 is linked by a connecting rod 31 to an eccentric 32, the rotation of which is controlled by a motor 33 and a worm-screw 34. This electric device 28 to 34 may, moreover, be replaced by a pneumatic device which holds down the beam 15 during the weighing operations of the machine and which raises it at the moment when it is desired to perform the self-checking operation.

The assemblies of the thrust roller 28 and its drive is started up at the desired moment by a calibrating programmer, which is dealt with later.

In addition, there are placed opposite the rear end of the second beam 15, between the stops 26 and 27, one or two micro-switches 35 and 36 which the said stops are able to operate if the beam 15 swings at the moment of checking.

The micro-contacts 35 and 36 is or are connected to the different electrical circuits which control the running of the machine.

The operation is as follows:

The weighing programmer, usually constituted by a motor-reduction gear with a camshaft, of known type and not illustrated, carries out the following operations:

Throughout the duration of the weighing of material, that is to say during the normal running of the mechanism, the roller 28 (or its pneumatic replacement) bears on the beam 15 which is disconnected from the machine.

The weighings follow one another normally and automatically in the pan 5 which is suspended from the beam 7. This process of weighing and opening continues in the way which has already been described, and it is controlled by the weighing programmer.

If it is supposed that it is desired to carry out a check of calibration, for example every 100 weighings, there is provided a preselection counter of known type, not shown, which counts the weighings of the hopper 5.

When the set figure, 100 for example, is reached, the pre-selection counter sends out an electric signal which:

(1) stops the weighing programmer, that is to say all weighing operations, (2) starts the calibrating programmer which instigates the subsequent operations, when the shutter 11 has been closed by the contact 14.

These subsequent operations are the following:

Opening of the bottom 8 of the balance to discharge the last weighing of the pan 5, Closing of the bottom 8 a moment later;

Raising of the roller 28, or of the similar part of the pneumatic jack, which releases the beam 15, which comes to bear on the first beam 7, as shown in FIGURE 2.

The weight 24 representing the weighing which it is proposed to calibrate therefore depresses both the beam 15 and the beam 7, until the assembly takes up a position of equilibrium. At this moment the calibrating programmer sends current into one or both of the microswitches 35 and 36. If both these remain open, as shown in FIGURE 2, this signifies that they are situated between the two stops 26 and 27 and that the balance is correct. When the calibrating programmer activates the device 28 to 34 through half a turn, or produces equivalent operation of the pneumatic jack which replaces the mechanism 28–34, the beam 15 is lowered and latched, it releases the beam 7 and the calibrating programmer opens the shutter 11 again and re-starts the belts 1. The machine begins to discharge again, the calibrating programmer makes the collecting belt 9 advance the desired amount, then as a last operation before stopping, it switches the current on to the weighing programmer for the succeeding weighing operations, until the preselection counter makes the opposite switching, at the end of 100 weighings, for example.

If, on the contrary, one of the micro-switches 34 and 35 is closed, this proves that the balance is not correct.

The calibrating programmer then sends an electric signal which passes through one or both of the micro-contacts; this electric current starts a hooter or a lamp, and stops the bale-breaker, or if so arranged, the section of bale-breakers, until the operative has done what is necessary to restart the machine after adjustment.

The bracket for the tolerance accepted for the value of the calibration weight depends, naturally, on the distance apart of the two stops 26 and 27 in relation to the micro-switches 35 and 36. This system of micro-switches may be replaced by any known device, and particularly by a small plate of regulable width attached to the rear end of the second beam 15. This plate normally interrupts the light rays given out by a lamp and picked up by a photo-electric cell. If the light does not pass, the calibrated weight is within the tolerance bracket. On the contrary, if the light passes, the photo-electric cell stops the entire installation. The tolerance bracket is defined by judicious choice of the width of the plate.

This device may also be replaced by a proximity contactor which stays ineffective when the balance is correct but gives a signal to stop the installation when the balance is incorrect.

It must however be understood that the preceding description has been given only by way of example and that it in no way limits the scope of the invention which will not be exceeded by replacing the constructional details described by any other equivalent.

In particular the scope of the invention will not be avoided by placing any number of bale-breakers so fitted side by side all discharging in synchronisation on to the collecting belt 9.

Similarly it has been supposed that the control beam 15 and the main beam 7 were placed in two perpendicular vertical planes but it is evident that they could be made to occupy any relative position, and, particularly, could be placed one below the other.

I claim:

1. A weigh feed mechanism comprising a first pivoted beam, a weigh pan suspended on said first pivoted beam, a second pivoted beam disposed above said first pivoted beam, a weight suspended from said second pivoted beam, control means for lowering one end of said second beam to bear on said first beam after a predetermined number of weighing operations of said weigh pan, when said pan is empty, and measuring means for sensing departure of said second beam for a correct inclination when said second beam rests on said first beam.

2. A weigh feed mechanism according to claim 1, wherein said measuring means comprises limit detection devices for detecting inclination of said second beam beyond the ends of a preselected tolerance.

3. A weigh feed mechanism according to claim 1, wherein said second beam carries a tare weight slider.

4. A weigh feed mechanism according to claim 2, wherein said measuring means further comprises a pair of spaced stops carried by said second beam and operatively engageable with limit switches.

5. A weigh feed mechanism according to claim 1, wherein said weigh pan and said weight are suspended respectively on said first and second beams to give the relationship $$\frac{a+b}{a} = \frac{c+d}{d}$$

where:

*a* is the distance between the pivot point of said second lever and the suspension point of said weight, and

*b* is the distance between the suspension point of said weight and the point at which said second lever engages with said first lever, and

*c* is the distance between said point at which said second lever engages on said first lever and the suspension point of said weigh pan, and

*d* is the distance between said suspension point of said pan and the pivot of said first lever.

6. A weigh feed mechanism according to claim 1, further comprising pressure means acting on said second beam on the opposite end of the pivot of said second beam to that end which engages with said first beam to hold said second beam clear of said first beam.

7. A weigh feed mechanism according to claim 6, further comprising programmer means to release said pressure means after a predetermined number of weighing operations of said weigh pan.

References Cited

UNITED STATES PATENTS 3,339,651  9/1967  Garnett _____ 177—55

RICHARD B. WILKINSON, *Primary Examiner.*

GEORGE H. MILLER, Jr., *Assistant Examiner.*